United States Patent
Van Den Abbeele (10) Patent No.: US 8,859,641 B2
(45) Date of Patent: Oct. 14, 2014

(54) PARTICLE IN THE SHAPE OF AN ENCAPSULATED DROPLET AND PROCESS FOR MAKING SUCH A PARTICLE

(75) Inventor: Henk Jan Frans Van Den Abbeele, Schaffen-Diest (BE)

(73) Assignee: Topchim N.V., Wommelgem (BE)

( * ) Notice: Subject to any disclaimer, the term of this patent is extended or adjusted under 35 U.S.C. 154(b) by 203 days.

(21) Appl. No.: 12/309,860

(22) PCT Filed: Jul. 23, 2007

(86) PCT No.: PCT/EP2007/006518
§ 371 (c)(1),
(2), (4) Date: May 15, 2009

(87) PCT Pub. No.: WO2008/014903
PCT Pub. Date: Feb. 7, 2008

(65) Prior Publication Data
US 2009/0253828 A1    Oct. 8, 2009

(30) Foreign Application Priority Data
Jul. 31, 2006 (EP) .................................. 06015867

(51) Int. Cl.
| | | |
|---|---|---|
| *C09D 133/24* | (2006.01) | |
| *B32B 1/00* | (2006.01) | |
| *B01J 13/02* | (2006.01) | |
| *C08K 3/00* | (2006.01) | |
| *D21H 21/54* | (2006.01) | |
| *C09B 67/08* | (2006.01) | |
| *C08F 8/32* | (2006.01) | |
| *C09D 7/12* | (2006.01) | |
| *C08F 222/06* | (2006.01) | |
| *C08K 9/10* | (2006.01) | |
| *D21H 21/30* | (2006.01) | |
| *C08L 91/00* | (2006.01) | |
| *D21H 19/44* | (2006.01) | |
| *C08L 39/04* | (2006.01) | |

(52) U.S. Cl.
CPC ............... *B01J 13/02* (2013.01); *C08F 222/06* (2013.01); *C08K 9/10* (2013.01); *D21H 21/54* (2013.01); *C09B 67/0013* (2013.01); *D21H 21/30* (2013.01); *C08F 8/32* (2013.01); *C08L 91/00* (2013.01); *D21H 19/44* (2013.01); *C09D 7/1266* (2013.01); *C09D 7/1291* (2013.01); *C08L 39/04* (2013.01); *C09D 7/1275* (2013.01)
USPC ........ 523/201; 428/402; 428/402.2; 428/407; 428/402.1; 424/490; 264/4.1; 264/4.3; 264/4.33

(58) Field of Classification Search
USPC .................. 428/402.22, 402.21, 402.24, 402; 430/109, 137, 138, 110; 525/217, 221, 525/262, 282, 285, 902; 528/170, 392, 322, 528/499
See application file for complete search history.

(56) References Cited

U.S. PATENT DOCUMENTS

| | | | | |
|---|---|---|---|---|
| 5,484,677 | A | * | 1/1996 | Inaba .......................... 430/110.1 |
| 2004/0052856 | A1 | * | 3/2004 | Stover et al. .................. 424/490 |
| 2004/0171771 | A1 | | 9/2004 | Kataoka et al. |
| 2004/0190138 | A1 | * | 9/2004 | Toyomasu et al. ............. 359/494 |
| 2005/0014868 | A1 | * | 1/2005 | Rasmusen et al. .............. 524/88 |
| 2005/0282956 | A1 | * | 12/2005 | Wang et al. .................... 524/555 |

FOREIGN PATENT DOCUMENTS

| | | |
|---|---|---|
| CN | 1343092 A | 4/2002 |
| EP | 1 398 635 | 3/2004 |
| WO | 99/45039 | 9/1999 |
| WO | 00/54590 A1 | 9/2000 |
| WO | 2007/014635 | 2/2007 |

OTHER PUBLICATIONS

Valton et al., Performance of cationic styrene maleimide copolymers in the wet end of papermaking, Solutions, 2004, TAPPI Journal, vol. 3, No. 4, p. 25-30.*
International Search Report issued Nov. 13, 2007 in International (PCT) Application No. PCT/EP2007/006518.
International Preliminary Report on Patentability issued Aug. 1, 2008 in International (PCT) Application No. PCT/EP2007/006518.
Chinese Application 200780028754.6 filed Jul. 23, 2007 Office Action dated Aug. 25, 2011.

* cited by examiner

*Primary Examiner* — James J Seidleck
*Assistant Examiner* — S. Camilla Pourbohloul
(74) *Attorney, Agent, or Firm* — Dinsmore & Shohl LLP (57) ABSTRACT

Particle in the shape of an encapsulated droplet comprising a core material and a shell material surrounding the core material, the shell material containing maleimide groups, preferably a copolymer of maleimide groups. The shell material contains a copolymer of styrene and maleic anhydride derivatives, of which more than 75 mole %, preferably more than 90 mole % is maleimide, and the average particle size is smaller than 300 nm. The particles are obtained by a process comprising by heating between 80° C. and 195° C., more preferably between 120° C. and 190° C. an ammonium salt of a maleic anhydride containing polymer in the presence of the core material.

16 Claims, 4 Drawing Sheets

PARTICLE IN THE SHAPE OF AN ENCAPSULATED DROPLET AND PROCESS FOR MAKING SUCH A PARTICLE

The invention relates to a particle in the shape of an encapsulated droplet comprising a core material and a shell material surrounding the core material, and to be used in the treatment of substrates.

Such particles are known and are used in many different applications.

In a number of applications these types of particles are applied to the surface of another body in order to have a complete or partial coating of the surface of that body.

Examples of such applications are treatment of paper, paper board, plastic, glass, metals, skin, hair, nails, leather, wood, stone, in order to improve their surface characteristics.

The application can usually be done by coating machines, printing techniques, spraying, smearing, dipping and so on. In a lot of applications treatment of substrates such as coating can only be done from a water phase. Examples of such applications are applying coatings in the paper industry or applying cosmetic formulations onto the skin. In the latter example it is recommended to limit the amount of solvent in order to prevent the drying of the skin. In a lot of other applications the use of organic solvents is limited or forbidden because of safety issues and environmental aspects. It is an advantage that during the application of the coating the particles are suspended or dispersed in an aqueous liquid, and that after application of the coating to a substrate and removing of the liquid, the coating is not solvable anymore in water thereby improving the stability and the adherence of the coating.

In the water borne formulation a binder may be present to improve the cohesion of the particles and the adhesion to the substrate.

In a number of applications wherein particles need to be applied to a substrate these particles are not water soluble. For that reason emulsions or dispersions are prepared from these particles, which subsequently can be applied to the substrates. In this type of applications it is commonly required to use surfactants in order to obtain a stable suspension of dispersion. Surfactants however have a number of possible negative effects for the process or on the coatings obtained.

Substrates coated with particles have a higher water sensitivity when these particles are dispersed with surfactants. Due to the higher hydrophilicity, the barrier properties against water are limited. It is well known that water borne paints often fail in protecting the substrates. While the coatings made of these paints stay intact, the substrates are affected by moisture that has penetrated through the coatings.

The increase of hydrophobicity is often very desirable. In the paper industry it improves the coating hold out when a next water borne coating layer is applied or it improves the ink take-up when off-set printing is applied. In the cosmetic industry the higher hydrophobicity of the applied materials will result in a higher durability. Active ingredients will not be washed away that easily. Sun screen in particular should not be rinsed away by swimming.

Furthermore, when making a dispersion of particles, these particles are often agglomerates of finer particles and it is difficult to get a dispersion of those fine particles, even after grinding the more coarse particles. Also the particle distribution is very broad. Another issue when starting with particles to make a water borne dispersion can be the limited solid content of the particles in the formulation. The presence of surfactants in the aqueous phase may also result in a decrease of cohesiveness and adhesiveness of the particles when applied to a product or substrate.

In view of the above mentioned problems the creation of a water dispersion of a high solid content of fine particles without using dispersants is advantageous, especially when the particles can encapsulate some of the desired ingredients in the core material of a particle.

The technique of this invention enables that non-water soluble materials can be made water-borne. Examples of such non-water soluble materials are paraffin oils, waxes, vaseline oils, white spirits, petroleum ethers, polyolefins, silicones, vegetables oils, alkanes, epoxidized oils, long alkyl containing ingredients. These hydrophobic materials may further contain active ingredients such as e.g. dyes, optical brighteners or UV absorbers.

Basic requirements to the particles in order to have an optimized use in their final application are a high solid content, no use of surfactants, forming a stable dispersion (preferably more than two months at room temperature), preferably transparent particles and high shear and/or pressure resistance. With respect to the transparency it may be sufficient that the particle is transparent if the particle size is below 300 nm.

The advantage of having particles with a core and a shell is that these particles can have characteristics that can not be obtained by a single component.

This and other objects of the invention are obtained by means of a particle of the above mentioned type in which the shell material contains maleimide groups. In principle, these groups are succinimide groups, but as they are usually derived from maleic anhydride groups, they are called maleimides.

Preferably the shell material is a copolymer of maleimide groups that is derived from a copolymer from a cyclic anhydride and vinyl monomer units. Preferably, the cyclic anhydride is for at least 75 mole % converted in its maleimide (succinimide) form, more preferably at least for 90 mole %.

Suitable cyclic anhydride monomers to prepare the copolymer are, for example, $\alpha$-$\beta$ unsaturated dicarboxylic anhydrides such as maleic anhydride and citraconic anhydride, itaconic anhydride and mixtures thereof. Preferably the copolymer contains maleic anhydride monomer units.

Suitable vinyl monomers for use in the copolymer include vinyl aromatic monomers (such as styrene, $\alpha$-methyl styrene, vinyl toluene and indene), mono-olefinic unsaturated hydrocarbons (such as ethylene, propylene and isobutylene), itaconic acid and its esters, $\alpha$-$\beta$-unsaturated carboxylic esters (such as acrylate esters (like ethylacrylate, butylacrylate and 2-ethylhexylacrylate), methacrylate esters (like methylmethacrylate, ethylmethacrylate and 2-hydroxyethylmethacrylate) and maleate diesters (like dioctylmaleate)), halogenated olefins (such as vinyl chloride and vinylidene chloride) and mixtures thereof. Preferably the copolymer contains readily commercially available styrene or $\alpha$-methyl styrene, although the presence of styrene monomer units is most preferred.

A copolymer containing vinyl monomer units and anhydride monomer units may be synthesised according to processes well known to the man skilled in the art, such as for example the process described in Hanson and Zimmerman, Ind. Eng. Chem. Vol. 49, nr. 11 (1957), p. 1803-1807.

Preferably use is made of a copolymer in which the anhydride monomer content ranges between 5-50 mole %, more preferably between 5 and 43 mole %

The molecular weight of this copolymer is preferably less than 500000, more preferably less than 200000 g/mole or less than 150000 g/mole. Ideally, the molecular weight of the starting copolymer is between approximately 20000 and 80000 g/mole as it allows obtaining so-called monodisperse dispersion with a narrow particle size distribution of between 50 and 150 nm.

According to one characteristic of the invention the particle size is smaller than 300 nm and the mean particle size is smaller than 200 nm. It is an advantage of such a particle that it is transparent and therefore useful to be used with coloring core material such as typically to be used in inkjet ink applications or cosmetic applications such as e.g. hair or skin colouring. It can further help to improve the gloss of porous substrates.

In a preferred embodiment of the invention the shell is made of a material having a Tg of at least 120° C. This makes the capsules resistant against high shear, pressure and temperature.

As explained above the particles can be used as such, in which case the core material is so to say an inert material. In some applications however it may be an advantage if the core material contains another active ingredient, such as ingredients providing optical brightness, dyes, opacifiers, UV-absorbing compositions or repelling agents. The ratio between the core material and the active ingredient can be between 10000:1 to 1:10, preferably between 10000:1 to 1:1.

It may well be that the core material also acts as an active ingredient; e.g having UV absorbing characteristics.

Preferably the active ingredients have an affinity with the core material. This affinity can also be partial, for instance in the case of polymers having hydrophobic and hydrophilic moieties.

A general characteristic when adding these active ingredients during the encapsulation process is that these components are getting very homogeneously distributed over the particles.

Examples of active ingredients are dyes, for instance oil soluble dyes that are often used in offset printing. Also dyes with a partial affinity for oils are suitable.

Other examples are optical brighteners as for instance stilbene and stilbene derivatives. Optical brighteners that are suited to be used in polyolefins are also suitable for this invention.

In a preferred embodiment of the invention the preparation of the core-shell particles is performed in the presence of metals, inorganic and organic pigments. In this case often a miniaturization of the metals or pigments takes place, leading to very stable dispersions. Examples of inorganic pigments are titaniumdioxide, calcium carbonate, talcum, gypsum, iron oxides, clay, kaoline. Examples of organic pigments are carbon black, carbon nanotubes and the classical pigments that are used for coloring materials. Examples of metals that can be used are aluminium, zinc, iron, gold, silver, platinum and cupper.

The miniaturization of the pigments or the metals leads often to an enhancement of the characteristics generated by these pigments or metals. When the particles become smaller a coloring pigment will have higher coloring power, a metal such as aluminium has a greater gloss improvement and a talcum will give higher hydrophobicity.

In another preferred embodiment the core material is a not-water soluble material, such as an oil, preferably vegetable oil, epoxidized oil, silicon oil, paraffin oil or vaseline oil, terpenes, waxes, fats, such as fatty acids, alkanes, polymers such as polyolefins. Most preferably are palm oil, soy bean oil, castor oil, rapeseed oil, sunflower oil, jathropha oil, silicon oil or all types of paraffin oils.

Composed to normal nano-particles based upon styrene maleimide polymers as described in WO2004/031249 the following advantages are obtained: cheap filling material, renewable materials as being natural products, higher solid content, the ability to add active ingredients to the core material and the possibility to add a larger amount of organic and inorganic pigments or metals during the production of the dispersion that on top of that are miniaturized during the production. Furthermore a smoother preparation process as a result of the lower viscosity is obtained.

The invention also relates to a process for making such a particle, a process as described above, in which cyclic anhydride co-polymers are converted into the imides in the presence of the core material and possibly also in the presence of the materials to be encapsulated in the core.

By using low viscous core materials it is affordable to start with a co-polymer for making the shell material that has already a relatively higher viscosity. In that respect the starting co-polymer may contain α-β-unsaturated dicarboxylic acids instead of the cyclic anhydrides. These can be obtained by fully or partial hydrolysis of cyclic anhydride containing co-polymers or are readily obtained by co-polymerisation of α-β-unsaturated dicarboxylic acids with vinyl monomers and possibly also unsaturated cyclic anhydrides.

The invention relates to a process for making such a particle as described above. This process is characterized in that the particles are obtained by heating above 100° C. an ammonium salt of a maleic anhydride containing polymer in the presence of the core material. In the method of this invention, the imidization reaction will mostly be carried out at a temperature above 100 C, preferably between 120-195 C, more preferably at a temperature between 130-180 C. Below 100 C insufficiently fast dimidiation has been observed. At a temperature above 170 C and in particular above 195 C, there is an increasing risk to agglomeration of the polymer, as a consequence of which particle formation in the dispersion is counteracted, giving particles with a too large size which are visible when applied as a coating.

Also, within the claimed temperature ranges sufficient imidization can be obtained within an economically feasible reaction time, at a pressure which is not too high, e.g. approximately 7 bar.

The ammonium salt can be obtained by treating the maleic anhydride containing polymer with ammonia or with an alkyl amine. As mentioned before these maleic anhydride groups may also be present under their hydrolysed form. Suitable alkyl amines are e.g. methylamine, ethylamine, isoproprylamine, butylamine, tertiary butylamine, benzylamine, cyclohexylamine. Also amines with longer alkyl chains can be used.

It is preferred to keep the excess of NH3 or RNH2 in the course of the imidizaton reaction as low as possible. To minimise the unnecessary loss of chemicals it is preferred that the molar ratio between the amine or NH3 and the anhydride monomer in the copolymer to be imidized ranges between 0.8:1 and 1.2:1, but is preferably an equimolar ratio or slightly less.

Preferably the reaction is carried out in water and the encapsulated material is not water soluble.

The aqueous polymer dispersion of this invention can have a solid content of more than 55 wt. %.

In a preferred embodiment of the invention the particles are formed through an emulsification process.

In an embodiment of the process according to the invention the particles are formed through the emulsification of a liquid by the ammonium salt of an anhydride functional polymer.

In another embodiment of the invention the core material is already a dispersed or emulsified product. Such a product is for instance a latex that is made through an emulsion polymerization. Examples are styrene butadiene latex and polyvinyl acetate latex.

According to an embodiment of the invention the particles are isolated from the solvent. This can be done by for instance spray drying or by acidifying the particles containing medium and filtering off the resultant precipitate. These solid particles can later be dispersed in a solvent or a resin, or can be blended in a polymer matrix. Such products can e.g. be used as impact modifiers in cured resins or in thermoplastic materials.

The ratio core to shell on a weight ratio can be between 90:10 to 1:40, preferably between 85:15 to 1:10.

Figure 1:
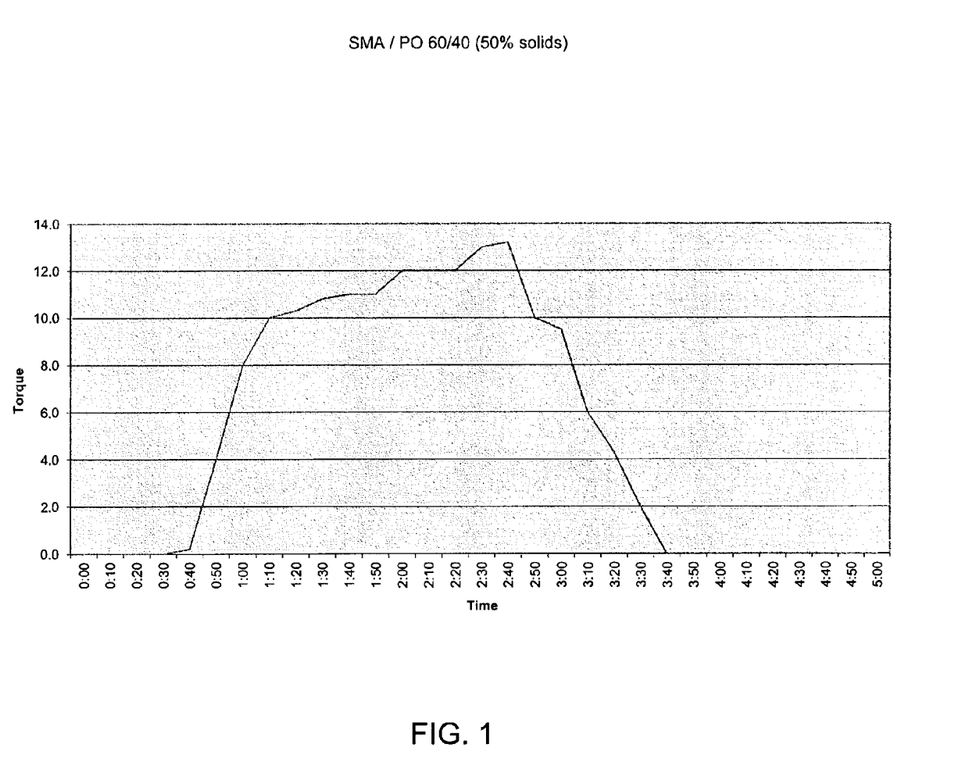
FIG. 1 is a graph illustrating the reaction time for converting a mixture of styrene maleic anhydride, ammonia, and 40% palm oil to a stable dispersion of oil-containing styrene maleimide nanoparticles in accordance with an embodiment of the invention described in Example 1.
Figure 2:
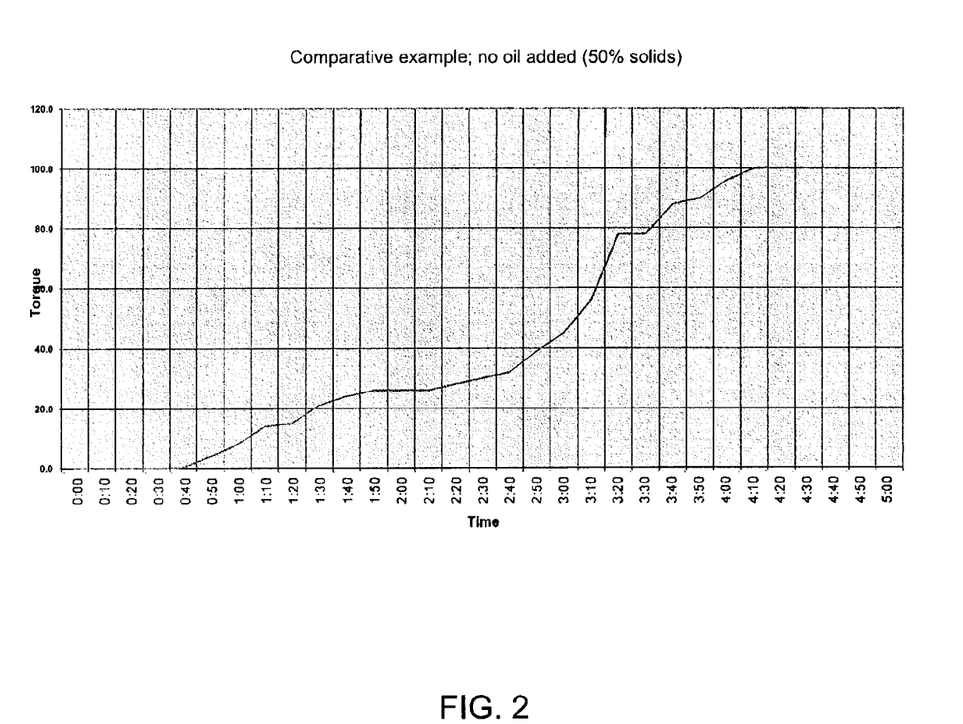
FIG. 2 is a graph illustrating reaction time for a comparative example in which no oil was added to the reaction.
Figure 3:
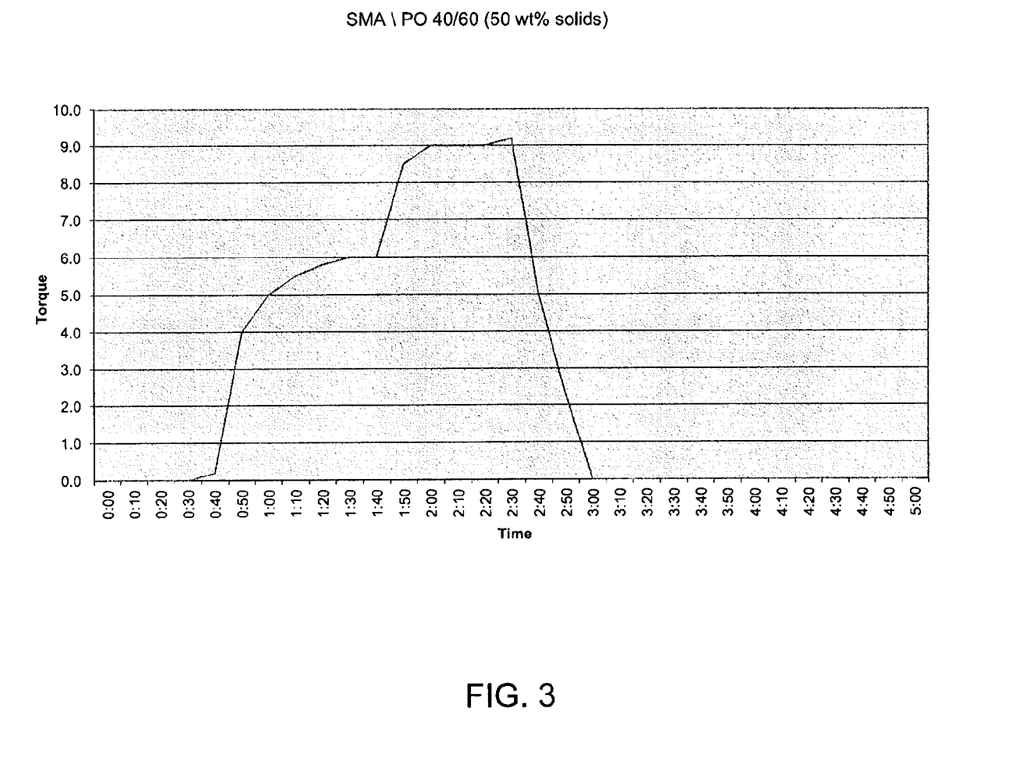
FIG. 3 is a graph illustrating the reaction time for converting a mixture of styrene maleic anhydride, ammonia, and 60% palm oil to a stable dispersion of oil-containing styrene maleimide nanoparticles in accordance with another embodiment of the invention described in Example 2.
Figure 4:
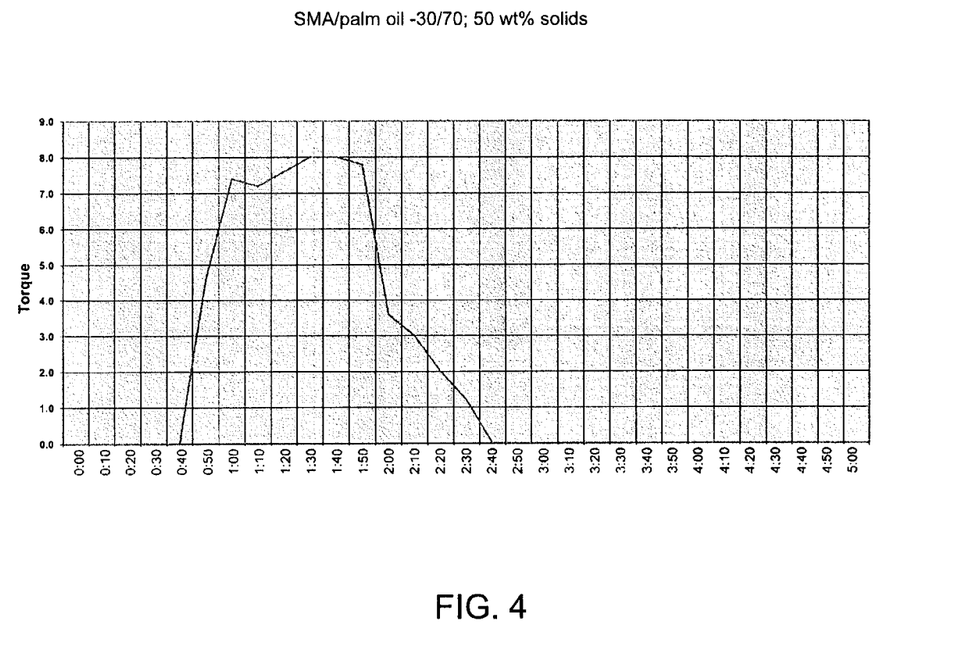
FIG. 4 is a graph illustrating the reaction time for converting a mixture of styrene maleic anhydride, ammonia, and 70% palm oil to a stable dispersion of oil-containing styrene maleimide nanoparticles in accordance with another embodiment of the invention described in Example 3.

The particles according to the invention can be used in a number of different applications.

In a first application the core material contains encapsulated dyes which behave as nano pigments, having an excellent stability in the water phase and after drying have no water sensitivity. Nowadays, nano-pigments are made by grinding pigments to the nano-phase, which is a very laborious process. Furthermore, these nano-pigments keep a higher water sensitivity due to the presence of surfactants.

Such particles could be useful in inks, more particularly in ink-jet inks, in dying of textile, hair coloring or coloring paper where they provide a high surface covering. In case of paper the dye is distributed very smoothly over the surface of the paper with hardly any missing dot. The pigments can be applied by a coating process, while in the current process the coloring of the paper proceeds by adding dyes or pigments during the paper production itself. In the latter a high amount of coloring agents is necessary which makes it very expensive.

Apart from the advantage obtained by the product itself the application to the substrate is simplified in that it is easy to clean the coating machine and it is easy to change from one color to another as this is nowadays limited to the down time for cleaning the machine.

In another application it is possible to apply very high optical brightness to some substrates. The commonly used water borne optical brighteners are sensitizing agents, which is a not desired characteristic when these products corn into contact with the skin. Detergents contain optical brighteners that after the washing cycle are left on the textile.

Some people show allergic reactions when coming into contact with these products. Furthermore, a lot of papers, having optical brighteners, are used for food contact applications where the presence of sensitizing agents should be avoided.

With the particles according to the invention it becomes possible to encapsulate optical brightening agents which are oil soluble. By encapsulation of the optical brighteners the direct contact between the products and human beings is avoided. Furthermore, the oil soluble optical brighteners do not contain the sensitizing chemical groups that should make them water soluble. When dissolving the agents in the oil the optimal performance is maintained as not stagging of the optical brighteners is taking place upon drying. Therefore, a reduced amount of optical brightener is needed in the overall formulation. Moreover the particles distribute very equally over the textile or the paper so that a very smooth performance is obtained.

In a third application the particles are used as a sun screen product, in that UV-absorbing agents such as e.g. octyl salicylate or cinnamate derivatives are dissolved in the oil forming the core material. The advantages obtained in this type of products are that the particles may adhere very well to the skin, are transparent, do not dissolve again in the water phase once they are dry and have a limited penetration into the skin, especially in case the molecular weight of the SMI-shell is higher than 20000. Also titanium dioxide can be used for that. During the encapsulation process the titanium dioxide is miniaturized so that it becomes less opaque once applied on the skin.

Another application is the dispersion of carbon nanotubes. These can be single-wall or multi-wall carbon nanotubes. The carbon nanotubes are known amongst others for their high conductivity. People are looking for a way to apply the carbon nanotubes in thin coating layers or paths, to be used e.g. as conductive layers or paths in electronic applications such as LED, OLED, RFID. Therefore, these nanotubes need to be dispersed first. By bringing the carbon nanotubes into an oil and making core-shell particles according to this invention this goal can be achieved.

Additional advantages are obtained in case the loading of the core material is higher than 20%. In this case the particles, once applied on a substrate, show gradually more the properties of the core material as the loading of the core material increases. Loadings of more than 50% of oil result in coatings with extremely high hydrophobicity.

Surprisingly, the dried coatings do not have a greasy feel. Also dispersions with this high loading of oil are very stable.

Some dedicated applications are obtained in paper treatment by particles according to the invention.

In order to give paper a higher hydrophobicity, currently, alkene ketene dimer or alkane succinic anhydride is used, but both products have major disadvantages. The first named because it has a long reaction time and the tendency to migrate out of the paper, the second named because it is too reactive with water and therefore gives processing problems. Also styrene acrylates are used but these show a lower hydrophobicity. Wax emulsions also provide hydrophobicity to the paper but they result in surfaces that are sticky and writing or printing on the paper is not possible anymore.

With particles according to the present invention excellent hydrophobic characteristics can be obtained, with Cobb-values of 10 or less the same time writing, printing or gluing on the coated paper surface is still feasible and the paper surface is not sticky. This is a unique combination of properties When applying the polymer dispersion of this invention to a surface, a coating is obtained which consists of a plurality of small, discrete pigment particles showing good adhesion to each other and to the surface to be coated. In some textile applications it is possible to produce a textile material which is semi-permeable, has an excellent water resistance but at the same time is permeable for air and water vapor, which is a clear advantage over water resistant textile material that is coated with a closed film.

For protecting wood substrates a coating is needed that prevents water from penetrating in the wood but that is permeable for water evaporating from the wood. The particles and the coatings described in this invention are very well suited for this type of applications.

The use of metals as active ingredient is interesting as it may lead to an increase of conductivity, gloss and opacity of the resultant coating. As mentioned before coatings obtained according to this invention always show very homogeneous distribution of the active ingredients over the resultant coating, while the ingredients are miniaturized. This makes these coatings suitable as paper or cardboard coating to absorb microwaves in a microwave oven to heat up the packed food.

Another application is the printing of dispersed metals to make conductive layers or paths. After printing the organic material is burnt away, leaving a conductive coating or path of metal.

The particles according to the invention have a fairly good cohesion with each other once dried. Also the adhesion with the substrates is good. In order to improve that further binders may be added such as starch, SBR latex, polyacrylates, polyvinylalcohol, polyesters, polyurethanes, epoxy resins, polyethylene acrylate co-polymers, polystyrene-acrylates, hyperbranched materials, poly styrene maleic anhydride and derivatives thereof. Also addition of combinations of binders can be very suitable to obtain specific properties.

Other additives such as biocides, vitamins, wax emulsions, UV absorbers, dyes humectants, metals, rheology modifiers, inorganic and organic pigments can be added to the formulations containing the particles according to the invention.

The particles may also be added to surfactant containing formulations such as water borne paints, cosmetic formulations, detergents, cleaning products, or shampoos. The particles may be added e.g. to improve gloss, abrasiveness, block resistance, water resistance, optical brightness.

Further advantages and characteristics of the invention will become clear from the following practical experiments.

EXPERIMENTS

Methods of Measuring

Particle Size

The average hydrodynamic radius of the particles of the dispersion after imidsation was determined using Photon Correlation Spectroscopy (PCS). Measurements were carried out using an ALV Laser of the Vertriebsgesellschaft mbH, Langen, Germany.

To perform the PCS measurement, a sample of a dispersion obtained with the claimed method, was diluted in demineralised water. The thus obtained sample was diluted 500 times to a solid content of approximately 0.04 wt % or less.

The cell used to perform the measurements was rinsed with dust free water, followed by three rinsing cycles with the sample to be measured.

Solid Content

The solid content was determined using an infrared dry/weigh instrument, type Mettler LP16/PM600.

pH Measurements

The pH value of each sample was measured with a Knick 752 Cl, nr. 051489 pH measurement instrument. The instrument was equipped with a loas electrode (3M KCl) and was calibrated at 20 C using buffer solutions having a pH of respectively 4.00 (citrate/HCl buffer), 7.00 and 9.00 from Merck. The pH of the samples was measured at 20 C.

Contact Angle Measurements

Contact angles were measured with a contact angle meter type Digidrop, GBX, Roman, France. The contact angle was measured based on a film of 250 images/s.

The invention is illustrated but not limited by the following examples.

Example 1

Preparation of Styrene Maleimide Nano-Particles Having a Palm Oil Content of 40 wt %

To a 1 liter double walled, oil heated autoclave, having an anchor stirrer 225 g of SMA and 334.4 g of water were added. The SMA had a maleic anhydride content of 26 mole % and a molecular weight of 80.000 g/mole. To this reaction mixture was added 150 g of palm oil (from Cargill, USA) and 40.6 g of a 25% NH3 solution so that the maleic anhydride (MA): NH3 ratio was about 1:1.

Following increasing the temperature to 160 C, at a rotation speed of 300 rpm, the pressure raised to 6 Barr and a maximum torque of 13 was observed. After 4 hours of reaction time the reaction mixture was cooled down to room temperature. A polymer dispersion was obtained having a solid content of approximately 50 wt. %, the particle size being between 25 and 120 nm. The pH value was 7.2, indicating an almost complete conversion of the maleic anhydride groups into maleimides. No precipitation of the particles to the walls of the reactor could be observed, making the cleaning of the reactor very easy.

The obtained dispersion was very stable. No oil separation from the water phase could be observed, even after standing for 3 months at room temperature.

Comparative Example

Styrene Maleimide Nano-Particles without Adding an Oil

This experiment was performed as described in example 1 but with 375 g SMA and 344.56 g of water. A 25% NH3 solution was added so that the MA:NH3 ratio was 1:1. During the reaction at 160 C the maximum torque raised leading to a gelled structure. The reaction had to be aborted.

It is experimentally established that the solid state content of pure maleimide nano-particles with this type of reactor is limited to a maximum solid content of 40 wt. %.

Example 2

Preparation of Styrene Maleimide Nano-Particles Having a Palm Oil Content of 60 wt %

This experiment was performed as described in example 1 but with 150 g SMA, 348 g of water and 225 g of palm oil. A 25% NH3 solution was added so that the MA:NH3 ratio was 1:1

Following increasing the temperature to 160 C, at a rotation speed of 300 rpm, the pressure raised to 6 Barr and a maximum torque of 9.2 was observed. After 4 hours of reaction time the reaction mixture was cooled down to room temperature. A polymer dispersion was obtained having a solid content of approximately 50 wt. %, the particle size being between 50 and 200 nm. The pH value was 7.2. The obtained dispersion was very stable. No oil separation from the water phase could be observed, even after standing for 3 months at room temperature.

Example 3

Preparation of Styrene Maleimide Nano-Particles Having a Palm Oil Content of 70 wt %

This experiment was performed as described in example 1 but with 112.5 g SMA, 354.7 g of water and 262.5 g of palm oil. A 25% NH3 solution was added so that the MA:NH3 ratio was 1:1

Following increasing the temperature to 160 C, at a rotation speed of 300 rpm, the pressure raised to 6 Barr and a maximum torque of 8 was observed. After 4 hours of reaction time the reaction mixture was cooled down to room temperature. A polymer dispersion was obtained having a solid state content of approximately 51 wt. %, the particle size being between 60 and 200 nm.

The obtained dispersion was very stable. No oil separation from the water phase could be observed, even after standing for 3 months at room temperature.

From above experiments it is clear that by increasing the amount of palm oil the maximum torque at which the reaction proceeds is much lower. That facilitates the process and if desired the solids content of such a dispersion can be increased even further.

Properties of the Oil Containing SMI Nano-Particles.

The dispersions as described in experiment 1 to 3 were applied to 95 g wood free, non sized paper in an average dry layer thickness of 7 g \m$^2$.

|  | Contact angle (Digidrop) | Cobb 120' value |
| --- | --- | --- |
| Example 1 | 76° | 27 g/m$^2$ |
| Example 2 | 98° | 14 g/m$^2$ |
| Example 3 | 102° | 6 g/m$^2$ |

From these experiments it is clear that the higher the content of palm oil is, the higher the hydrophobicity of the resultant coating is. This is measured by a higher contact angle, but also by a reduced Cobb value, which is a standard measuring tool in the paper industry for hydrophobicity. It measures the amount of water taken up by a well defined surface of water during a certain time.

Example 4

Preparation of Paraffin Oil Containing Styrene Maleimide Nano-Particles

This example is performed as described in example 1, but 225 g of SMA and 334.4 g of water were used. To this reaction mixture was added 150 g of paraffin oil and 40.6 g of a 25% NH3 solution.

Following increasing the temperature to 155 C, at a rotation speed of 200 rpm, the pressure raised to 5 Barr and a maximum torque of 10 was observed. After 4 hours of reaction time the reaction mixture was cooled down to room temperature. A polymer dispersion was obtained having a solid content of approximately 50 wt. %, the particle size being between 30 and 125 nm. The pH value was 6.5.

The obtained dispersion was very stable. No oil separation from the water phase could be observed, even after standing for 3 months at room temperature.

Example 5

Preparation of Castor Oil Containing Styrene Maleimide Nano-Particles

This example is identical to example 4, except that 150 g of castor oil is used instead of paraffin oil.

Following increasing the temperature to 155 C, at a rotation speed of 200 rpm, the pressure raised to 6 Barr and a maximum torque of 11 was observed. After 4 hours of reaction time the reaction mixture was cooled down to room temperature. A polymer dispersion was obtained having a solid content of approximately 50 wt. %, the particle size being between 40 and 160 nm.

The obtained dispersion was very stable. No oil separation from the water phase could be observed, even after standing for 3 months at room temperature.

Example 6

Preparation of SMI Nano-Particles Containing Optical Brightener

See example 1.175 g of SMA, 318.4 g of water and 157.5 g of palm oil were used. To the oil was added 17.5 g of thiophenediyl benzoxazole (from Ciba SC). To this reaction mixture was added 31.6 g of a 25% of NH3 solution. Following increasing the temperature to 160 C, at a rotation speed of 300 rpm, the pressure raised to 6 Barr and a maximum torque of 15 was observed. After 4 hours of reaction time the reaction mixture was cooled down to room temperature. A polymer dispersion was obtained having a solid content of approximately 50 wt. %, the particle size being between 30 and 120 nm.

The obtained dispersion was very stable. No oil separation from the water phase could be observed, even after standing for 3 months at room temperature.

Paper Coating Formulation
Formulation A:

| CaCO3 (78% dispersion in water) | 89 parts |
| --- | --- |
| Kaoline (77% dispersion in water) | 39 parts |
| SBR latex (50% dispersion in water) | 20 parts |
| Nano-particles according to example 6 | 20 parts |

Formulation B: for Comparison
As formulation A but instead of nano particles

| Polyvinylalcohol (20% solution in water) | 20 parts |
| --- | --- |
| Tinopal OB (from Ciba SC, Switzerland) | 1 part |

Paper Brightness Test:
ELRHEPHO test (brightness measurement equipment) on a 100 g/m$^2$ pre-coated wood free 100 g base paper with 13 g/m$^2$ coating weight
Formulation A=96
Formulation B=95
Opacity ELRHEPHO Test
Formulation A=99.9
Formulation B=99.2
Gloss before Calendar: Gardner Equipment, Angle of 75°
Formulation A=51
Formulation B=47

From these measurements it is clear that formulation A, with the encapsulated optical brightener, is performing at least as good as the reference material (formulation B), whereby the optical brightener is dissolved in the water phase and whereby a chain extender such as polyvinylalcohol is necessary to get optimal performance. Furthermore, the brightness of the coating obtained with formulation A was very homogeneously spread over the paper.

Example 7

Preparation of SMI Nano-Particles Containing Fat Yellow 3G

See example 1. 180 g of SMA, 420 g of water and a mixture of 75 g of palm oil with 15 g of Fat Yellow 3G (from Clariant, Switzerland). To this reaction mixture was added a 25% of NH3 solution so that the MA:NH3 ratio was 1:1.

After 4 hours of reaction time at 155 C the reaction mixture was cooled down to room temperature. A polymer dispersion was obtained having a solid content of approximately 40 wt. %, the particle size being between 30 and 120 nm.

The obtained dispersion was very stable. No oil separation from the water phase could be observed, even after standing for 3 months at room temperature.

100 parts of the dispersion obtained from this example were blended with 8 parts of a SBR latex. The resultant dispersion was coated on a paper. The dried coated paper showed a very homogeneous distribution of the yellow colour, hardly any missing dots, an excellent opacity and a high hydrophobicity. The contact angel with water was 95° (Digidrop measurement).

Example 8

Preparation of Oil Containing SMI Nano-Particles Dispersing Carbon Nanotubes To a 1 liter double walled, oil heated autoclave, having an anchor stirrer, were added 175 g of SMA and 318.4 g of water. The SMA had a maleic anhydride content of 26 mole % and a molecular weight of 80.000 g/mole. To this reaction mixture were added a blend of 157.5 g of palm oil (from Cargill, USA) and 16.6 g carbon nanotubes (from Nanocyl Belgium), having a diameter of 3 nm and a length of about 5 micrometer. Thereafter 31.6 g of a 25% of NH3 solution was added. Following increasing the temperature to 160 C, at a rotation speed of 300 rpm, the pressure raised to 7 Barr and a maximum torque of 15 was observed. After 4 hours of reaction time the reaction mixture was cooled down to room temperature. A polymer dispersion was obtained having a solid content of approximately 50 wt. %.

The obtained dispersion was very stable. No oil separation from the water phase could be observed, even after standing for 2 months at room temperature.

Example 9

Preparation of Oil Containing SMI Nano-Particles Dispersing TiO2

33 g of TiO2 was dispersed in 197 g of palm oil. This dispersion was added to a 1 liter double walled, oil heated autoclave, having an anchor stirrer. To this 133 g of SMA, 309 g of water and 24 g of a 25% water solution of NH3 was added. The SMA had a maleic anhydride content of 26 mole % and a molecular weight of 80.000 g/mole. The reaction mixture was stirred and heated at 155 C for 3 hours. Thereafter, the reaction mixture is cooled down and a very stable dispersion was obtained. No oil separation from the water phase could be observed, even after standing for 3 months at room temperature.

The same reaction without the oil did not lead to a dispersion. Coagulation occurred. The dispersion as described in this example was diluted with twice the amount of water and applied to skin. No opacifying effect was observed, while the coating once dried was non-sticky and had a high hydrophobicity. It could not be removed by prolonged rinsing with water.

Example 10

Preparation of Oil Containing SMI Nano-Particles Dispersing Carbon Black

The example described in example 9 was repeated with the exception that 50 g of carbon black was used instead of 33 g of TiO2. The reaction time was 4 hours. A very stable dispersion was obtained. No oil separation from the water phase could be observed, even after standing for 3 months at room temperature.

The reactor could be cleaned very easily and the dispersed carbon black could be easily washed away by water. When coated to paper and dried, the resultant coating shows a very homogeneous distribution of the black colour over the paper without hardly any missing dots.

Example 11

Preparation of Oil Containing SMI Nano-Particles Dispersing Aluminium Powder The example described in example 9 was repeated with the exception that 33 g of aluminium powder was used instead of 33 g of TiO2. Furthermore 150 g of palm oil and 150 g of SMA were used. The solids content was 50% and the ammonia was added such that the mole ratio ammonia to cyclic anhydride groups was 1 to 1. The reaction time was 4 hours and the pressure of the reaction reached 22 Barr. A very stable dispersion was obtained. No oil separation from the water phase could be observed, even after standing for 3 months at room temperature.

100 parts of formulation B, as described under example 6, were blended with 20 parts of the dispersion described under this example. The gloss of the resultant coating on paper increased from 40 to 50 (Gardner, angle 70°) when compared with the coating based on formulation B.

Example 12

Preparation of Oil Containing SMI Nano-Particles Dispersing CaCO3

The example described in example 9 was repeated with following quantities: 184 g of palm oil, 133 g of SMA, 290 g of water and 116 g of CaCO3 powder. MA:NH3 ratio was 1:1. The reaction time was 1 hour and the pH of the dispersion was 7.5. A very stable dispersion was obtained. No oil separation from the water phase could be observed, even after standing for 1 month at room temperature. The same reaction was also performed without using the oil, which led to coagulation.

A 100 g/m² pre-coated wood free 100 g base paper was coated with the dispersion to give a 10 g/m² coating weight. The coating was very hydrophobic but it was still possible to write on this paper. Furthermore, this coating showed a very good coating hold out behaviour (a second water borne coating layer remains at the surface and is not sucked into the paper), while the dry and the wet pick of the second layer are excellent.

Example 13

Preparation of Oil Containing SMI Nano-Particles Dispersing Talcum

The example described in example 9 was repeated with following quantities: 184 g of palm oil, 133 g of SMA, 290 g of water and 60 g of talcum. MA:NH3 ratio was 1:1. The reaction time was 2 hours and the pH of the dispersion was 7.2. A very stable dispersion was obtained. No oil separation from the water phase could be observed, even after standing for 1 month at room temperature. No thickening of time is observed as often is the case with dispersions of talcum. The same reaction was also performed without using the oil, which led to coagulation.

Example 14

Preparation of Oil Containing SMI Nano-Particles Dispersing D&C Red No 30

The sample as described in example 9 was repeated, except that 33 g of TiO2 was replaced by 25 g of D&C Red No 30. The reaction was performed for 4 hours. After cooling down a stable dispersion was obtained.

The invention claimed is:

1. A water dispersible particle in the shape of an encapsulated droplet comprising a core material and a shell material surrounding the core material, wherein the shell material is a non-crosslinked copolymer containing maleimide groups that is derived from a copolymer of a cyclic anhydride and a vinyl monomer,
   wherein the copolymer of cyclic anhydride and vinyl monomer has been converted into an imide by the reaction of said anhydride containing copolymer with ammonia or an alkyl amine by heating at a temperature between 100° C. and 195° C. in the presence of the core material; and
   the particle has an average particle size of smaller than 300 nm.

2. The water dispersible particle according to claim 1, wherein the shell material contains a copolymer of styrene and maleic anhydride, of which more than 75 mole % of the cyclic anhydride is converted to its maleimide form.

3. The water dispersible particle according to claim 1, wherein the Tg of the shell material is above 120° C.

4. The water dispersible particle according to claim 1, wherein the core material contains an active ingredient.

5. The water dispersible particle according to claim 1, wherein the core material is not water soluble.

6. The water dispersible particle according to claim 1, wherein the core:shell weight ratio is between 90:10 and 1:40.

7. The water dispersible particle according to claim 1, wherein the particles are isolated from solvent.

8. A method for coating a substrate which comprises coating the substrate with an aqueous dispersion of particles as claimed in claim 1.

9. The method as claimed in claim 8, wherein the substrate is paper, cardboard, textile, glass, leather, wood or wood derived substrates, metal, plastic, skin, hair, nails or stone.

10. Substrate treated with particles according to claim 1.

11. The water dispersible particle according to claim 1, wherein the shell material contains a copolymer of styrene and maleic anhydride, of which more than 90 mole % of the cyclic anhydride is converted to its maleimide form.

12. The water dispersible particle according to claim 5, wherein the non-water soluble core material is an oil, an alkane, a terpene, a polyolefin or a wax.

13. The water dispersible particle according to claim 5, wherein the core material is a vegetable oil, epoxidized oil, vaseline oil, silicon oil or paraffin oil.

14. The water dispersible particle according to claim 5, wherein the core material is palm oil, soy bean oil, rapeseed oil, silicon oil or a paraffin oil.

15. The water dispersible particle according to claim 5, wherein the core:shell weight ratio is between 85:15 and 1:10.

16. The water dispersible particle according to claim 1, wherein the core:shell weight ratio is between 85:15 and 1:10.

* * * * *